(12) United States Patent
Wang et al.

(10) Patent No.: US 12,154,596 B2
(45) Date of Patent: Nov. 26, 2024

(54) VIDEO EDITING METHOD AND APPARATUS

(71) Applicant: Beijing Zitiao Network Technology Co., Ltd., Beijing (CN)

(72) Inventors: Jiaxin Wang, Beijing (CN); Yijing Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/391,411

(22) Filed: Dec. 20, 2023

(65) Prior Publication Data
US 2024/0170025 A1    May 23, 2024

Related U.S. Application Data

(63) Continuation of application No. PCT/CN2023/132373, filed on Nov. 17, 2023.

(30) Foreign Application Priority Data

Nov. 17, 2022  (CN) .......................... 202211440612.3

(51) Int. Cl.
*G11B 27/036*    (2006.01)
*H04N 23/63*    (2023.01)

(52) U.S. Cl.
CPC ......... *G11B 27/036* (2013.01); *H04N 23/632* (2023.01)

(58) Field of Classification Search
None
See application file for complete search history.

(56) References Cited

U.S. PATENT DOCUMENTS

2009/0132947 A1* 5/2009 Seol ....................... G11B 27/34
                                                              715/772
2010/0119203 A1    5/2010 Lewis
(Continued)

FOREIGN PATENT DOCUMENTS

CN    108363534 A    8/2018
CN    111357277 A    6/2020
(Continued)

OTHER PUBLICATIONS

International Patent Application No. PCT/CN2023/132373; Int'l Search Report; dated Feb. 6, 2024; 2 pages.

*Primary Examiner* — Eileen M Adams
(74) *Attorney, Agent, or Firm* — BakerHostetler

(57) ABSTRACT

A video editing method is provided. A clip identifier in one-to-one correspondence with a video clip indicated by a video editing template is displayed based on the video editing template, to prompt a user to import a video material for a specified video clip corresponding to the clip identifier; in response to a trigger operation of presenting an editing result, the editing result, which is obtained by applying, on a target video material, a specified editing operation indicated by the video editing template, is presented, wherein the target video material corresponds to the specified video clip; the target video material is used to be imported into the corresponding specified video clip to form the editing result; and if the specified video clip includes a first video clip into which the user does not import a video material, a preset video material is added into the first video clip.

19 Claims, 8 Drawing Sheets

---

Acquiring a video editing template, and displaying a clip identifier based on the video editing template, wherein the video editing template is used for instructing to apply a specified editing operation on at least one specified video clip, the clip identifier corresponds to the specified video clip on a one-to-one basis, and the clip identifier is used for prompting to import a video material for the specified video clip corresponding to the clip identifier — S101

↓

In response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which a video material is not imported in response to the trigger operation — S102

(56) References Cited

U.S. PATENT DOCUMENTS

| | | | | |
|---|---|---|---|---|
| 2010/0281375 A1* | 11/2010 | Pendergast | ........... | G11B 27/036 |
| | | | | 715/723 |
| 2014/0317527 A1* | 10/2014 | Won | ................... | G06F 3/04817 |
| | | | | 715/746 |
| 2020/0380060 A1* | 12/2020 | Siani Cohen | ......... | G06F 16/958 |

FOREIGN PATENT DOCUMENTS

| | | |
|---|---|---|
| CN | 113439277 A | 9/2021 |
| CN | 114268748 A | 4/2022 |

* cited by examiner

```
┌─────────────────────────────────────────────────────────────┐
│   Acquiring a video editing template, and displaying a clip identifier  │
│ based on the video editing template, wherein the video editing template │
│  is used for instructing to apply a specified editing operation on at least │ S101
│ one specified video clip, the clip identifier corresponds to the specified │
│    video clip on a one-to-one basis, and the clip identifier is used for │
│      prompting to import a video material for the specified video clip │
│                    corresponding to the clip identifier                 │
└─────────────────────────────────────────────────────────────┘
                                 │
                                 ▼
┌─────────────────────────────────────────────────────────────┐
│ In response to a trigger operation of presenting an editing result, based │
│          on a target video material and the specified editing operation, │
│   presenting the editing result that is obtained by applying the specified │
│  editing operation on the target video material, wherein the target video │
│ material corresponds to the specified video clip on the one-to-one basis; │ S102
│  the target video material is used to be imported into the specified video │
│ clip corresponding to the target video material, so as to form the editing │
│         result; and if the specified video clip includes a first video clip, │
│ the target video material corresponding to the first video clip is a preset │
│     video material, and the first video clip is a specified video clip into │
│             which a video material is not imported in response          │
│                           to the trigger operation                      │
└─────────────────────────────────────────────────────────────┘
```

Fig. 1

Acquiring a video editing template, and displaying a clip identifier based on the video editing template, wherein the video editing template is used for instructing to apply a specified editing operation on at least one specified video clip, the clip identifier corresponds to the specified video clip on a one-to-one basis, and the clip identifier is used for prompting a user to import a video material for the specified video clip corresponding to the clip identifier — S101

In response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which the user does not import a video material in response to the trigger operation — S102

During the process of presenting the editing result that is obtained by applying the specified editing operation on the target video material, in response to a trigger operation for the clip identifier corresponding to the specified video clip, importing a video material into a selected specified video track or replace the imported video material in the selected specified video clip — S103

Updating the editing result based on the video material that is imported by the user into the selected specified video track or based on a replacement video material that is imported into the specified video clip selected by the user, and present the updated editing result — S104

Fig. 2

VIDEO EDITING METHOD AND APPARATUS

CROSS REFERENCE TO RELATED APPLICATIONS

This application is a continuation of PCT Application No. PCT/CN2023/132373, filed Nov. 17, 2023, which claims priority to Chinese Application No. 202211440612.3, filed Nov. 17, 2022, and titled "VIDEO EDITING METHOD AND APPARATUS", the disclosures of which are incorporated herein by reference in their entireties.

FIELD

The present disclosure relates to the technical field of video processing, and in particular, to a video editing method and apparatus.

BACKGROUND

With the continuous and rapid development of the Internet technology, more and more users prefer to record their lives in the form of videos, and the users often prefer to edit a plurality of video materials into a video with rich visual effects. In order to facilitate the editing of the users and reduce the requirements for the video editing skills of the users, some video editing application programs provide video editing templates for the users, and the users may edit and integrate the video materials into a complete video just by performing editing operations indicated by the video editing templates. However, when the video editing application programs are used for editing, it is usually necessary to import all video materials required by the video editing templates and then enter template editing pages to preview the editing effects, such that the preview flexibility is relatively low, it is extremely inconvenient for the users, and thus the editing experience is relatively poor.

SUMMARY

In order to solve the above technical problems, the present disclosure provides a video editing method and apparatus.

In a first aspect, the present disclosure provides a video editing method, including:
  acquiring a video editing template, and displaying a clip identifier based on the video editing template, wherein the video editing template is used for instructing to apply a specified editing operation on at least one specified video clip, the clip identifier corresponds to the specified video clip on a one-to-one basis, and the clip identifier is used for prompting a user to import a video material for the specified video clip corresponding to the clip identifier; and
  in response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which the user does not import a video material in response to the trigger operation.

In some embodiments, the method further includes: if the specified video clip includes a second video clip, the target video material corresponding to the second video clip is a video material that is imported by the user for the second video clip, and the second video clip is a specified video clip into which the user has imported a video material in response to the trigger operation.

In some embodiments, the method further includes:
  displaying a preview control, wherein when the user does not import a video material into the specified video clip corresponding to any clip identifier, the preview control is in an inoperable state; and
  when it is detected that a video material is successfully imported into the specified video clip corresponding to the at least one clip identifier, switching the preview control from the inoperable state to an operable state, wherein the preview control is in the operable state is used for triggering to present the editing result.

In some embodiments, displaying the clip identifier based on the video editing template includes: displaying a material aggregation display page based on the video editing template, and displaying the preview control in the material aggregation display page; or, displaying a photographing page based on the video editing template, and displaying the preview control in the photographing page.

In some embodiments, the method further includes: during the process of presenting the editing result that is obtained by applying the specified editing operation on the target video material, in response to a trigger operation for the clip identifier corresponding to the specified video clip, importing a video material into a selected specified video track or replacing the imported video material in the selected specified video clip.

In some embodiments, if there are a plurality of clip identifiers, displaying the clip identifier based on the video editing template includes: displaying the plurality of clip identifiers based on the video editing template in a tiled manner; and the method further includes: when it is detected that a switching condition is met, displaying the plurality of clip identifiers in a stacked manner.

In some embodiments, the method further includes: in the case where the specified video clip includes one first video clip, and the user has imported video materials into all specified video clips other than the first specified video clip, acquiring a photographed video material; and in response to a confirm-to-use instruction for the photographed video material, triggering to present the editing result, wherein the confirm-to-use instruction is used for confirming that the photographed video material is the target video material on the first video clip.

In some embodiments, the method further includes: in the case where the specified video clip includes one first video clip, and the user has imported video materials into all specified video clips other than the first specified video clip, acquiring a video material from an album; and in response to a confirm-to-upload instruction for the video material acquired from the album, triggering to present the editing result, wherein the confirm-to-upload instruction is used for confirming that the photographed video material is the target video material on the first video clip.

In a second aspect, the present disclosure provides a video editing apparatus, including:
  an acquisition module configured to acquire a video editing template;

a processing module configured to generate a clip identifier based on the video editing template, wherein the video editing template is used for instructing to apply a specified editing operation on at least one specified video clip, the clip identifier corresponds to the specified video clip on a one-to-one basis, and the clip identifier is used for prompting a user to import a video material for the specified video clip corresponding to the clip identifier; and a display module configured to display the clip identifier; the processing module is further configured to: in response to a trigger operation of presenting an editing result, based on a target video material and the specified editing operation, present the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which the user does not import a video material in response to the trigger operation; and the display module is further configured to present the editing result.

In a third aspect, the present disclosure provides an electronic device, including: a memory and a processor;

the memory is configured to store a computer program instruction; and the processor is configured to execute the computer program instruction, so that the electronic device implements the video editing method in the first aspect and any item of the first aspect.

In a fourth aspect, the present disclosure provides a readable storage medium, including: a computer program instruction; and an electronic device executes the computer program instruction, so that the electronic device implements the video editing method in the first aspect and any item of the first aspect.

In a fifth aspect, the present disclosure provides a computer program product, wherein an electronic device runs the computer program product, so that the electronic device implements the video editing method in the first aspect and any item of the first aspect.

The embodiments of the present disclosure provide a video editing method and apparatus, wherein in a scenario in which the video editing template is used for performing video editing, the clip identifier in one-to-one correspondence with the video clip indicated by the video editing template is displayed based on the video editing template, so as to prompt the user to import the video material into the specified video clip corresponding to the clip identifier; in response to the trigger operation of presenting the editing result, the editing result, which is obtained by applying, on the target video material, the specified editing operation indicated by the video editing template, is presented, wherein the target video material corresponds to the specified video clip on the one-to-one basis; the target video material is used to be imported into the corresponding specified video clip to form the editing result; and if the specified video clip includes the first video clip into which the user does not import the video material, the preset video material is added into the first video clip. By using the method, in the case where the video material is not completely imported into the video clip indicated by the video editing template, the user can conveniently and flexibly preview the editing result, thereby improving the video editing experience.

BRIEF DESCRIPTION OF THE DRAWINGS

The drawings are incorporated in and constitute a part of the present specification, illustrate embodiments conforming to the present disclosure, and serve to explain, together with the specification, the principles of the present disclosure.

To illustrate technical solutions in the embodiments of the present disclosure or in the prior art more clearly, a brief introduction on the drawings which are needed in the description of the embodiments or the prior art is given below. Apparently, other drawings may be obtained by those ordinary skilled in the art according to these drawings without any creative effort.

FIG. 1 is a flowchart of a video editing method provided in an embodiment of the present disclosure;

FIG. 2 is a flowchart of a video editing method provided in another embodiment of the present disclosure;

DETAILED DESCRIPTION OF EMBODIMENTS

Figure 3A:
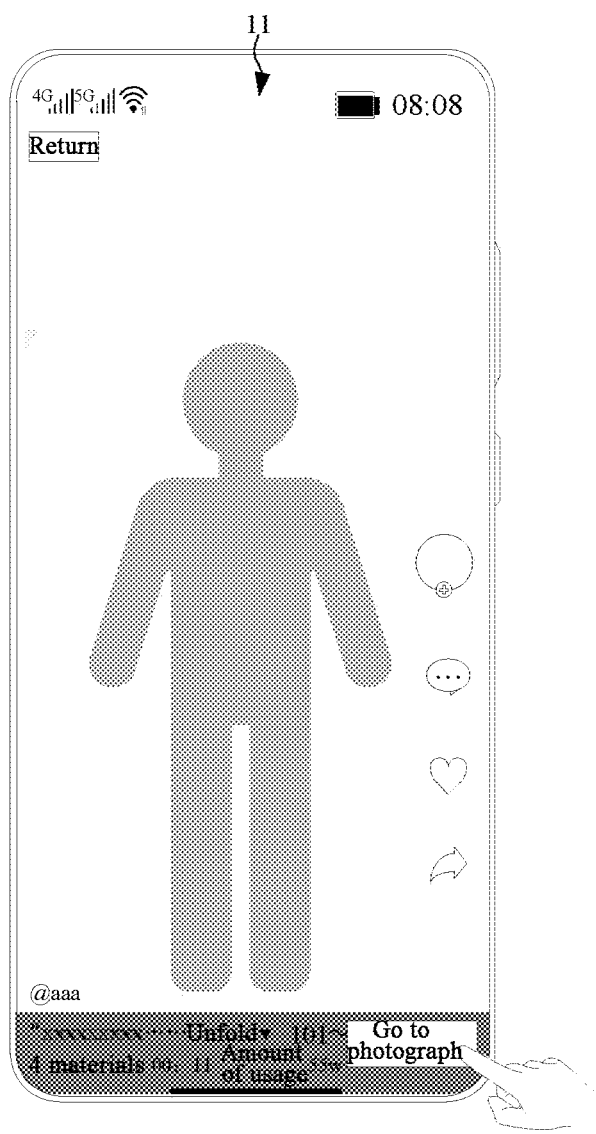
FIG. 3A to FIG. 3I are schematic diagrams of a human-computer interaction interface provided in the present disclosure.

In order to more clearly understand the above objectives, features and advantages of the present disclosure, the solutions of the present disclosure will be further described below. It should be noted that, in the case of no conflict, the embodiments of the present disclosure and the features in the embodiments may be combined with each other.

Numerous specific details are set forth in the following description to facilitate a thorough understanding of the present disclosure, but the present disclosure may also be implemented in other different manners than that described herein; and obviously, the embodiments in the specification are only a part, but not all, of the embodiments of the present disclosure.

Exemplarily, a video editing method provided in the present disclosure may be implemented by a video editing apparatus, the video editing apparatus may be implemented by software and/or hardware, and may generally be integrated in an electronic device. The electronic device may be, but is not limited to, electronic devices such as a tablet computer, a mobile phone (such as a folding-screen mobile phone, a large-screen mobile phone, or the like), a wearable device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), and the specific type of the electronic device is not limited in the present disclosure in any way.

In the following embodiments, the electronic device is taken as an example to describe the video editing method provided in the present disclosure in detail, in combination with the drawings and application scenarios.

FIG. 1 is a flowchart of a video editing method provided in an embodiment of the present disclosure. Please refer to FIG. 1, the method in the present embodiment includes:

S101: acquiring a video editing template, and displaying a clip identifier based on the video editing template, wherein the video editing template is used for instructing to apply a specified editing operation on at least one specified video clip, the clip identifier corresponds to the specified video clip on a one-to-one basis, and the clip identifier is used for prompting a user to import a video material for the specified video clip corresponding to the clip identifier.

A video editing application program (hereinafter referred to as an application for short) may be installed in the electronic device, if the application program is started, the user may browse template videos which are edited by using different video editing templates, the template video referred to herein is a video, which is created by a creator using the video editing template and is published in the application program, a playback page of the template video may include a use entrance of the video editing template, and the user inputs a trigger operation for the use entrance, so as to trigger the use of the video editing template for video editing, wherein the trigger operation for the use entrance may be, but is not limited to, operations such as single click, double click, long press, slide, etc.

The application program acquires the video editing template in response to the trigger operation for the use entrance of the video editing template, and the video editing template may include information such as the number, sequence and duration of the specified video clips, the information of a specified editing operation, and information for indicating the specified editing operation is applied to the video material of which video clip, wherein the specified video clip may be understood as a video track clip, which is indicated by the video editing template and into which no video material is added, and there may be one or more specified video clips, which is not limited in the present disclosure; and the specified editing operation may include, but is not limited to, one or more operations, such as a special effect operation, a filter operation, a music operation, a text operation, a music editing operation, etc.

Based on the specified video clip indicated by the video editing template, the application program may display the clip identifier corresponding to each specified video clip, wherein the clip identifier may be implemented by any method, for example, being implemented by the combination of one or more of text, icon, picture and the like, which is not limited in the present disclosure.

In some embodiments, in response to the trigger operation for the use entrance of the video editing template, the application program may skip from the playback page of the template video to a material aggregation display page, wherein the material aggregation display page is used for performing aggregation display on image materials in an album, these image materials may include photographs and videos, which are photographed by the user in advance, images and videos, which are downloaded from the network, screenshots obtained by screenshot operations, and the like; and the clip identifier in one-to-one correspondence with the video clip indicated by the video editing template is displayed in the material aggregation display page, the user may select the image materials from the material aggregation display page to generate a target video material and import the target video material into the specified video clip, a thumbnail of the imported video material may be displayed in the clip identifier corresponding to the specified video clip into which a video material is imported, and a preset image and the duration of the video clip may be displayed in the clip identifier corresponding to the video clip into which a video material is not imported.

In some embodiments, in response to the trigger operation for the use entrance of the video editing template, the application program may skip from the playback page of the template video to a photographing page, and display, in the photographing page, the clip identifier in one-to-one correspondence with the video clip indicated by the video editing template; the user may perform photographing by means of a camera to obtain a video material, when confirming to use the video material, the user adds the video material into the specified video clip as the target video material, and the user may repeatedly execute an operation of photographing and confirming to use the photographed video material, so as to add target video materials into specified video clips corresponding to different clip identifiers. In order to enable the user to flexibly add the video material, an entrance for entering the material aggregation display page may also be disposed in the photographing page, and by means of the entrance, the user may select the image materials from the album to generate the target video material and add the same into the specified video clip. When this mode is utilized, the target video materials added into the specified video clip may be completely or partially photographed by the camera, or may be completely or partially imported by means of the material aggregation display page, or may include both the photographed video materials and the materials in the album, which are imported by means of a material aggregation page.

In the present step, by means of displaying, to the user, the clip identifier corresponding to the video clip, the user may clearly know how many video materials need to be imported, the imported video materials are added into which specified video clip, the video materials have been imported to which specified video clips, the video materials have not been imported to which specified video clips, and other information.

In addition, when entering the material aggregation display page or the photographing page from the playback page of the template video, it may be positioned to a certain preset clip identifier by default, for example, it is positioned to the first clip identifier by default, the user may switch the selected clip identifier by means of an operation (such as click, sliding and the like), and import a video material into the specified video clip corresponding to the selected clip identifier. In this way, it is convenient for the user to flexibly select the sequence of importing the video materials according to his/her own requirements.

In addition, in order to meet the video editing requirement of the user, after importing a video material into a certain specified video clip, the user may also delete or replace the video material in the specified video clip.

S102: in response to a trigger operation of presenting an editing result, based on the target video material and the specified editing operation, presenting the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which the user does not import a video material in response to the trigger operation.

In the present solution, according to whether the user imports a video material into the specified video clip, the specified video clip may be divided into two types, that is, a first video clip and a second video clip, the first video clip is a specified video clip into which the user does not import a video material in response to the trigger operation, and the second video clip is a specified video clip into which the user imports a video material in response to the trigger operation.

Based on the video material imported by the user, the specified video clip indicated by the video editing template may be divided into several situations: situation 1, there is only the first video clip (i.e., the user does not import a video material into any specified video clip); situation 1, there is only the second video clip (i.e., the user imports video materials into all specified video clips); and situation 3, there is both the first video clip and the second video clip (i.e., the user imports video materials into some specified video clips and does not import video materials into some specified video clips).

In view of the situation 1 and the situation 3, due to the presence of the first video clip into which no video material is imported, in order to realize preview, a preset video material may be added into the first video clip, the preset video material is used as the target video material on the first video clip to form an editing result, and the editing result is presented to the user. For the situation 2, since all specified video clips have the video materials imported by the user, the video materials imported by the user are used as target video materials to form an editing result, and the editing result is presented to the user. In this way, it can be ensured that no matter whether the user imports a sufficient number of video materials, each specified video clip indicated by the video editing template has a video material, thereby meeting the requirements of the video editing template.

The preset video material may be, but is not limited to, generated based on a preset image, and may also be a video material segment, which is intercepted from a pre-specified video material and is consistent with the duration of the first video clip. In the present disclosure, parameters such as image content, size, resolution and the like of the preset image are not limited, for example, the preset image may be a pure-color background image, such as gray, black, white, etc. In the present disclosure, parameters such as video content, duration, resolution and the like of the pre-specified video material are not limited, for example, the pre-specified video material may be a blank content video of a pure-color background, such as gray, black, white, etc.

In response to the trigger operation, the application program applies the specified editing operation to the target video material in the corresponding specified video clip, so as to obtain the editing result. The editing result may be an editing draft, which is formed by importing the target video material into the specified video clip indicated by the video editing template, and the editing draft may further include information of the specified editing operation, or the like; or, the editing result may also be a target video, which is exported by the user after importing the target video material into the specified video clip indicated by the video editing template, and applying, on the target video material corresponding to the corresponding specified video clip, the specified editing operation indicated by the video editing template. It should be noted that, the manner of presenting the editing draft is to perform rendering based on the target video material and the specified editing operation, and play video frames one by one according to a time sequence; and the manner of presenting the target video is to play each frame of image included in the target video according to the time sequence.

For example, the video editing template corresponds to four specified video clips, and then there are four clip identifiers; the user respectively imports two photographed video materials into a specified video clip 1 and a specified video clip 2, and does not import video materials into a specified video clip 3 and a specified video clip 4; and it is assumed that the specified editing operation indicated by the video editing template is a text operation and a music operation, and is applied in global, when it is triggered to present the editing result, video materials added with text and music are played in a time period corresponding to the specified video clip 1 and the specified video clip 2, and a gray background video added with text and music is played in a time period corresponding to the specified video clip 3 and the specified video clip 4.

As another example, the video editing template corresponds to four specified video clips, and then there are four clip identifiers; the user respectively imports two photographed video materials into the specified video clip 1 and the specified video clip 2, and respectively imports two segments of videos in the album into the specified video clip 3 and the specified video clip 4; and it is assumed that the specified editing operation indicated by the video editing template is the text operation and the music operation, and is applied in global, since there is no first video clip into which the user does not import a video material, there is no need to add the preset video material, and then when it is triggered to present the editing result, video materials, which are added with text and music and are imported by the user, are played in a time period corresponding to the specified video clip 1 and the specified video clip 4.

When the editing result is presented in the form of the editing draft, the application program provides a preview page, and a rendered video frame image is displayed in the preview page. In addition, when entering the preview page, it may be positioned to a starting location of a time axis by default, and playback is started from the starting location. Automatic loop playback may be performed in the preview page, and automatic pause may also be performed after once playback is ended, the playback is started from the starting location of the time axis again based on an operation of the user for triggering the playback, which is not limited in the present disclosure.

According to the method provided in the present embodiment, in a scenario in which the video editing template is used for performing video editing, the clip identifier in one-to-one correspondence with the video clip indicated by the video editing template is displayed based on the video editing template, so as to prompt the user to import the video material into the specified video clip corresponding to the clip identifier; in response to the trigger operation of presenting the editing result, the editing result, which is obtained by applying, on the target video material, the specified editing operation indicated by the video editing template, is presented, wherein the target video material corresponds to the specified video clip on the one-to-one basis; the target video material is used to be imported into the corresponding specified video clip to form the editing result; and if the specified video clip includes the first video clip into which the user does not import the video material, the preset video material is added into the first video clip. By using the method, in the case where the video material is not completely imported into the video clip indicated by the video editing template, the user can conveniently and flexibly preview the editing result, thereby improving the video editing experience.

On the basis of the embodiment as shown in FIG. 1, by means of an operable control (hereinafter referred to as a preview control for short) in a user interface provided by the application program, the user may trigger to present the editing result.

In some embodiments, the preview control may be always in an operable state, and no matter whether the user imports a video material into the specified video clip, the editing result may be previewed.

In some other embodiments, when a video material to be edited is not added into all specified video clips, the preview control is in an inoperable state, and when it is detected that the user imports a video material into at least one specified video clip, the preview control is switched from the inoperable state to an operable state. The application program may enable the user to clearly distinguish whether the preview control is operable by means of different display styles. For example, whether the preview control is operable may be distinguished in one or more manners, such as different display colors, different brightness, different fonts, different icons, etc.

In the present embodiment, by means of presenting a visual operation entrance to the user, the user can conveniently trigger the preview, and the editing experience of the user can thus be effectively improved.

In addition, on the basis of the embodiment as shown in FIG. 1, if there are a plurality of specified video clips indicated by the video editing template, there are also a plurality of clip identifiers corresponding to the specified video clips, so as to be consistent with the number of the specified video clips. The playback page of the template video skips to the material aggregation display page/photographing page, and the plurality of clip identifiers are displayed in the material aggregation display page/photographing page, wherein the application program supports to display the plurality of clip identifiers in a tiled manner and a stacked manner, and repeatedly switches between the two display styles of the tiled manner and the stacked manner when it is detected that a switching condition is met.

In some embodiments, in the material aggregation display page/photographing page, the plurality of clip identifiers may be displayed in the tiled manner by default, and when it is detected that a first switching condition is met, the tiled manner is switched to the stacked manner for display, wherein the first switching condition may be that a click operation is not detected within a preset duration. Next, if it is detected that a second switching condition is met, the stacked manner is switched to the tiled manner for display, wherein the second switching condition may be that the click operation is detected. By means of switching the display style of the clip identifier, the visual perception is improved, and the interestingness of the user during the process of using the application program for editing can also be improved.

FIG. 2 is a flowchart of a video editing method provided in another embodiment of the present disclosure. Please refer to FIG. 2, on the basis of the embodiment as shown in FIG. 1, after step S102, the method in the present embodiment further includes:

S103: during the process of presenting the editing result that is obtained by applying the specified editing operation on the target video material, in response to a trigger operation for the clip identifier corresponding to the specified video clip, importing a video material into a selected specified video track or replacing the imported video material in the selected specified video clip.

During the process of the application program presenting the editing draft by means of the preview page and playing the video frame image obtained by rendering, in order to meet the editing requirement of the user, the clip identifier corresponding to the specified video clip indicated by the video editing template may be displayed in the preview page, the clip identifier is in the operable state, the user imports a video material into the first video clip by means of operating the clip identifier, so as to replace the currently used preset video material, and the user may also replace, by means of operating the clip identifier, the video material in the second vide clip, which is imported by the user.

In some embodiments, in response to a trigger operation of the user for any clip identifier in the preview page, such as single click, double click, long press and other operations, the application program may enter a material editing page, a photographing entrance and an uploading entrance may be displayed to the user in the material editing page, and by means of photographing or uploading, the user may import a video material into the first video clip and replace the video material in the second video clip, which is imported by the user.

In the material editing page, it is positioned, by default, to the specified video clip corresponding to the clip identifier operated by the user, and the user may also switch the selected specified video clip in the material editing page.

According to the method in the present embodiment, the user may add or update the video material on the specified video clip corresponding to the clip identifier by means of operating the clip identifier in the preview page, and there is no need for the user return to the previous-level page to perform adding or updating, such that the operation is simple and convenient, and the editing experience of the user can be effectively improved.

On the basis of the embodiment as shown in FIG. 2, optionally, the method further includes:

S104: updating the editing result based on the video material that is imported by the user into the selected specified video track or based on a replacement video material that is imported into the specified video clip selected by the user, and presenting the updated editing result.

With regard to the video material that is imported by the user into the selected specified video track, it should be understood that the specified video clip is the first video clip, the target video material corresponding thereto is the preset video material, the preset video material is replaced with the video material imported by the user as the target video material, and the first video clip may be updated to the second video clip.

With regard to the replacement video material that is imported by the user into the selected specified video track, it should be understood that the specified video clip is the second video clip, and the originally imported video material in the second video clip is replaced with the replacement video material imported by the user as the target video material.

The application program may re-generate an editing result based on the newly imported target video material or the replaced target video material, target video materials on other non-operated specified video clips, and the specified editing operation, and present the editing result to the user by means of the preview page when the user returns to the preview page, or, obtain a edited target video based on an export instruction input by the user, and play the edited target video to present the editing result to the user.

On the basis of the embodiments as shown in FIG. 1 and FIG. 2, in a conventional manner, after the user imports video materials into all specified video clips, the user needs to execute a plurality of operation steps to preview the editing result, which is extremely inconvenient for the user. In order to solve the problem, so as to better facilitate the preview of the user and reduce the operation steps of the user, the method provided in the present disclosure further supports to automatically enter the preview page to present the editing result, when a video material is imported into the last first video clip.

The last first video clip may be understood as: the specified video clip indicated by the video editing template includes one first video clip, and the user has imported video materials into all specified video clips other than the first video clip.

If a video material is imported into the last first video clip by means of photographing, the user may start the camera for photographing, so as to acquire a photographed video material, and a video confirmation page is displayed to the user; the user may input a confirm-to-use instruction by means of the video confirmation page, and in response to the confirm-to-use instruction for the photographed video material, the user imports the photographed video material into the first video clip and triggers to present the editing result, wherein the confirm-to-use instruction is used for confirming that the photographed video material is the target video material on the first video clip. The video confirmation page may include a rephotographing control and a confirm-to-use control, and the user may input the confirm-to-use instruction by means of operating the confirm-to-use control; and in addition, the user may also perform rephotographing by means of operating the rephotographing control, and operate the confirm-to-use control in the video confirmation page again to input the confirm-to-use instruction after the photographing is completed.

In the conventional manner, after operating the confirm-to-use control, the user returns to the photographing page at first, so that the user needs to operate the preview control in the photographing page, so as to trigger to present the editing result. By using the present solution, when confirming to use the photographed video material, the user may automatically enter the preview page to preview editing result without returning to the photographing page for operating, thereby effectively reducing the operation steps of the user.

If a video material is imported into the last first video clip by means of uploading, the user may enter the material aggregation display page from the uploading entrance in the photographing page, select an image material to be uploaded, and acquire the video material based on the selected image material. A confirm-to-upload control may be displayed in the material aggregation display page, and the user may input a confirm-to-upload instruction by means of operating the confirm-to-upload control, and in response to the confirm-to-upload instruction, the user imports, into the first video clip, the video material that is generated based on the image material selected by the user, and triggers to present the editing result.

In the conventional manner, after operating the confirm-to-upload control, the user returns to the photographing page or other pages at first, so that the user needs to operate the preview control in the photographing page, so as to trigger to present the editing result. By using the present solution, when confirming to use the photographed video material, the user may automatically enter the preview page to preview editing result without returning to the photographing page for operating, thereby effectively reducing the operation steps of the user.

Next, based on the foregoing description, in conjunction with FIG. 3A to FIG. 3I, the specific implementation process of the video editing method provided in the present disclosure will be described in detail below by taking it as an example that the electronic device is a mobile phone, a client installed in the mobile phone includes a video editing application program (referred to as application 1 for short), a template video currently browsed by the user is a template video corresponding to a video editing template 1 (referred to as template 1 for short), and the template 1 indicates four corresponding video clips, that is, four video materials need to be used for editing.

Please refer to FIG. 3A to FIG. 3I, FIG. 3A to FIG. 3I are schematic diagrams of a human-computer interaction interface provided in an embodiment of the present disclosure.

It is taken as an example that the mobile phone in a vertical-screen state, the application 1 may display, on the mobile phone, a user interface 11 as shown in FIG. 3A, the user interface 11 is used for displaying one playback page in the application 1, and multimedia content, for example, the template video corresponding to the template 1, may be played in the playback page.

The user interface 11 is further used for displaying related information of the template 1, for example, the nickname of a publisher of the template 1 (for example, the publisher of the template video is displayed in the form of ("@+nickname of the publisher"), the theme of the template 1, a topic in which the template 1 participates, the number of video materials to be used by the template 1, and other information.

The user interface 11 may further include a control 101. The control 101 is used for triggering the use of the template 1. The control 101 may be displayed in a text manner, for example, displayed in the form of "go to use" or "go to photograph", and when being displayed in different texts, the control 101 may correspondingly enter different pages.

For example, if displayed in the form of "go to use", the control 101 may skip from the playback page of the template video to the material aggregation display page, the user may select an image material by means of the material aggregation display page, the image material selected by the user may be a photo, an image or a video, if the image material selected by the user is a photo or an image, the application 1 may automatically generate a segment of video material based on the selected photo or image, and the generated video material is the video material to be imported by the use into the video clip of the template 1, wherein the duration of the generated video material matches a duration indicated by the corresponding video clip.

For example, if displayed in the form of "go to photograph", the control 101 may skip from the playback page of the template video to the photographing page. In the photographing page, a video material to be edited may be acquired in a manner such as real-time collection, from the application 1, from a storage module other than the application 1, etc.

Figure 3B:
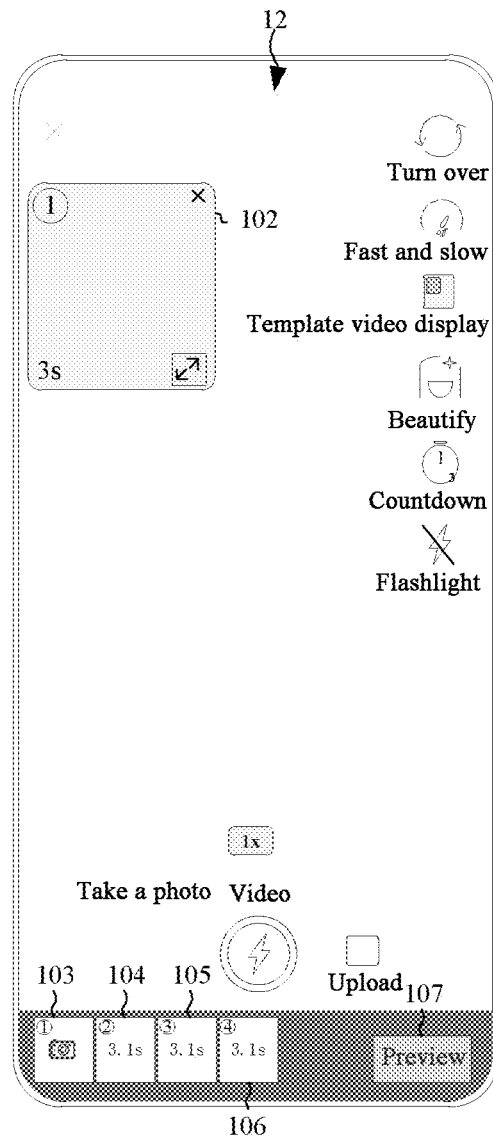

Exemplarily, when the application 1 receives a trigger operation of the user for the control 101, the application 1 may display, on the mobile phone, a user interface 12 as shown in FIG. 3B, wherein the user interface 12 is mainly used for displaying the photographing page. The specific implementation manner of the user interface 12 is not limited in the present disclosure.

Referring to FIG. 3B, a photographing tool icon may be displayed in the photographing page, for example, one or more of photographing button, exposure lens, timer, flashlight, prop, template video display switch, double speed, video photographing mode button, photographing mode button, lens proportion adjustment, and the like. For example, the photographing button may be disposed at a location close to the bottom on the entire photographing page, and other photographing tool icons may be centrally disposed at locations close to the edge on the entire photographing page, so as not to shield a photographed picture as much as possible.

The photographing page supports the user to switch between a video photographing mode and a photographing mode by means of operating the video photographing mode button and the photographing mode button; in some embodiments, when entering the photographing page, it may be positioned to the video photographing mode by default, and a front camera is selected by default for photographing; and in some embodiments, if a material to be added into the video clip corresponding to the currently selected clip identifier is a photo, it may be positioned to the photographing mode, and if the user switches to the video photographing mode, a prompt message may be displayed at the top of the photographing page, so as to prompt the user that the effect corresponding to the video clip only supports the photo.

The photographing page supports the user to adjust the proportion of the lens, so as to zoom in or zoom out a picture collected by the camera of the mobile phone. When using the front camera for photographing, the user reduces the proportion of the lens, so as to ensure that an image within a greater view angle may be collected in a front selfie scenario.

In addition, the template video may also be displayed in the photographing page in the style of a small window, and the location of the small window is movable; and as shown in FIG. 3B, a region 102 is a small window region, which is used for playing the template video. The region 102 may be used for determining to use a landscape-screen style or a vertical-screen style according to a horizontal to vertical ratio of the template video, and if the region 102 cannot be fully filled, the region 102 may be filled with black edges. The video material on the currently photographed video clip is displayed in the region 102, as shown in FIG. 3B, the first video material to be edited is currently photographed, and then "1" or "clip 1" may be displayed. The region 102 may further include a zoom-out button, and the user may reduce the region 102 to a preset proportion by clicking the zoom-out button. In addition, the user may switch a template video picture and a photographed picture in the region 102 by clicking any location of the template video picture in the region 102.

The user interface 12 further includes: a region 103 to a region 106, wherein the region 103 is used for displaying a clip identifier 1 corresponding to a video clip 1, a region 104 is used for displaying a clip identifier 2 corresponding to a video clip 2, a region 105 is used for displaying a clip identifier 3 corresponding to a video clip 3, the region 106 is used for displaying a clip identifier 4 corresponding to a video clip 4, and the region 103 to the region 106 may be arranged in a sequence from left to right, so as to correspond to the sequence of the video clips 1-4. The user may click any one of the region 103 to the region 106 to select one of the four video clips, and may also switch the selected video clip by means of clicking different regions. The clip identifier corresponding to the video clip in a selected state and the clip identifiers corresponding to unselected video clips utilize different display styles, so as to facilitate the distinguishing of the user. For example, as shown in FIG. 3B, a photographing icon is displayed in the region 103 corresponding to the video clip 1, which is in the selected state currently, and the duration information of the video clips is displayed in the region 104 to the region 106, which respectively correspond to the unselected video clips 2 to 4.

In addition, in order to facilitate the user to distinguish the second video clip from the first video clip, a video thumbnail may be displayed in the region corresponding to the second video clip, and the duration information of the corresponding video clip is displayed in the region corresponding to the first video clip.

Figure 3C:
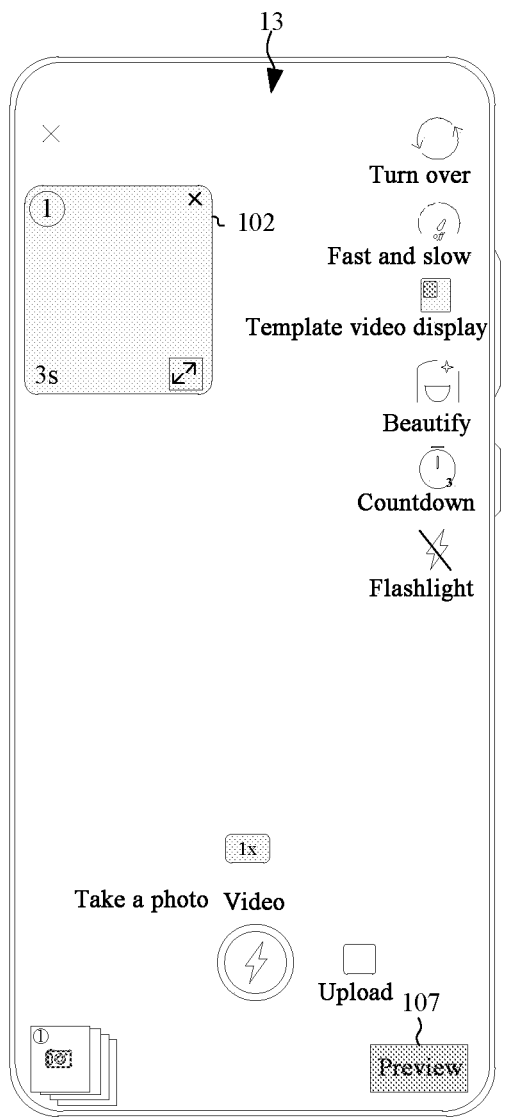

In some cases, when entering the photographing page, all clip identifiers may be displayed in a tiled display style by default, and if it is detected that a switching condition is met, a stacked display style according to the sequence of the video clips may be switched to. For example, the switching condition may be that a click operation is not detected within a preset duration, the preset duration may be, but is not limited to, 2 seconds, 3 seconds, and the like, which may be set according to requirements. Exemplarily, it is assumed that when the application 1 displays the photographing page, as shown in FIG. 3B, a plurality of clip identifiers are displayed in the tiled display style by default, if the click operation is not detected exceeding more than 2 seconds, a user interface 13 as shown in FIG. 3C may be displayed, and the plurality of clip identifiers are displayed in the stacked display style.

In the present solution, the template video displayed in the region 102 has a corresponding relationship with the video clip 1 to the video clip 4, and when the region corresponding to a certain clip identifier is clicked, the video clip corresponding to the clip identifier is selected, and at this time, if the region 102 is in an open state, then an original video clip corresponding to the selected video clip in the template video is correspondingly displayed in the region 102.

After entering the photographing page, a video material may be imported into the video clip by means of photographing or uploading. If the photographing button is clicked, the photographed video material is the video material on the video clip corresponding to the selected clip identifier; and if the uploading button is clicked, the material aggregation display page can be entered to select an image material, and the video material is obtained based on the selected image material, and is imported into the video clip corresponding to the selected clip identifier. After photographing or uploading is completed, it is returned to the photographing page, and it is possible to display a related dynamic effect for indicating that the video clip corresponding to the clip identifier is filled, so as to improve the interestingness; and then, both the clip identifier and the region 102 need to be positioned to the clip identifier corresponding to the current first video clip, so that the user can directly continue to photograph or upload without manually switching to the first video clip.

The video clip into which the video material has been imported supports to delete the imported video material, wherein a deletion button may be displayed in the region where the clip identifier corresponding to the video clip is displayed, and the user deletes the imported video material from the video clip by means of clicking the corresponding deletion button in the region.

The video clip into which the video material has been imported supports to edit the imported video material, wherein an editing button may be displayed in the region where the clip identifier corresponding to the video clip is displayed, and the user enters an editing page by means of clicking the corresponding editing button in the click region. If the duration of the imported video material is greater than the duration of the video clip, the clip may be selected in the editing page in a dragging manner, and if the duration of the imported video material is less than or equal to the duration of the video clip, the picture may be zoomed in or zoomed out and the location thereof may be adjusted in the editing page; and if the imported video material is generated based on photo/image, the picture may be zoomed in or zoomed out and the location thereof may be adjusted in the editing page.

The user interface 12 further includes a control 107, wherein the control 107 is used for entering the preview page. The control 107 has two states: an operable state and an inoperable state, the state of the control 107 may be distinguished by different colors, of course, the control 107 may also be distinguished in other manners, which is not limited in the present disclosure. For example, when the control 107 is in the inoperable state, it may be displayed in "gray background+dark gray font", and when the control 107 is in the operable state, it may be displayed in other colors, for example, "white background+black font". As shown in FIG. 3B, a video material is imported into none of the current four video clips, therefore the control 107 is displayed in "gray background+dark gray font", and is in the inoperable state.

In combination with the foregoing description and with reference to FIG. 3B, it is currently shown in the user interface 12 that the video material is imported into none of the current four video clips, it is assumed that the selects the clip identifier 1, that is, selects the video clip 1, and clicks the photographing button for photographing, during photographing, countdown may be performed based on the setting of a timer, the photographing is started after the countdown is finished, and after the photographing is started, the photographing tool icon on the side edge may be hidden, so as to reduce the shielding of the photographed picture by these photographing tool icons as much as possible, and generally, the user rarely clicks the photographing tool icons during the photographing process, so that the problem of poor user experience is not caused by the hidden display. During the photographing process, a progress bar displays the video photographing progress according to the duration of a video material required by the current slot; the photographing duration may be displayed in real time according to a started photographing time; multi-clip photographing is supported; during the photographing, the photographing may be paused by means of clicking the photographing button, and the photographing may be continued when the photographing button is clicked again; and the present solution further supports to perform text editing in photographing preview and delete the previously photographed clip.

Figure 3D:
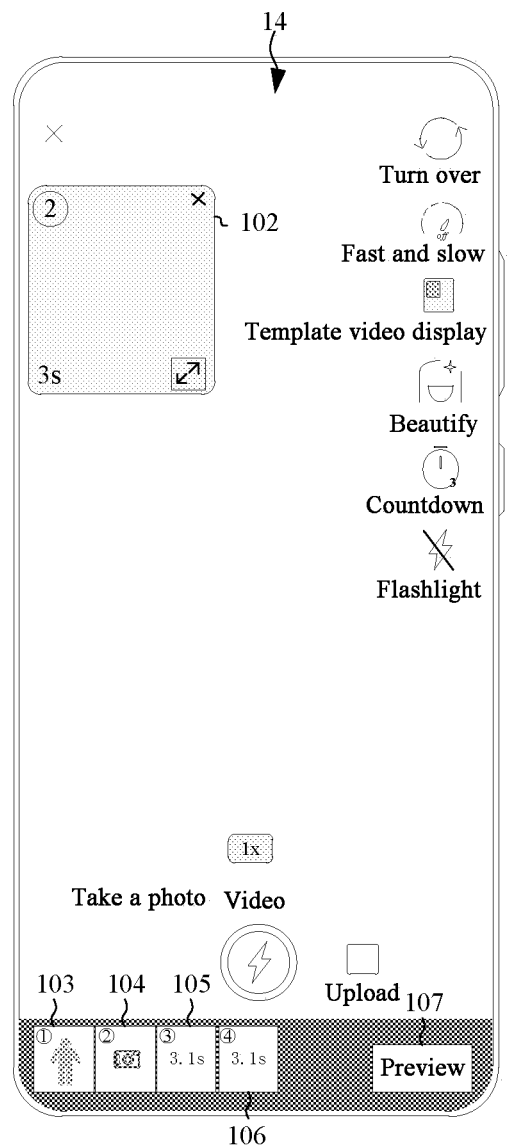

When the photographing is finished, the photographing page may be skipped to the video confirmation page, the video confirmation page may provide the "confirm-to-use control" and the "rephotographing control", and a complete video that is obtained by synthesizing the photographed video with text may be displayed in the video confirmation page by means of one region. If the user operates the confirm-to-use control, the user may skip back to the page as shown in FIG. 3D, position to the clip identifier 2, select the video clip 2 and continues the photographing of the video clip 2, and when returning to the page as shown in FIG. 3D from the video confirmation page, it is possible to display a related dynamic effect for indicating that the video material is added into the video clip 1. If the user operates the rephotographing control, the user returns to the photographing page of the previous video material, and empty the content of the previous photographing. In addition, the video confirmation page further supports to save the currently synthesized complete video in a local album, and the user may save the video by means of checking related options. It should be understood that, if the user does not edit the text during the photographing process, the photographed video is displayed in the video confirmation page.

Figure 3E:
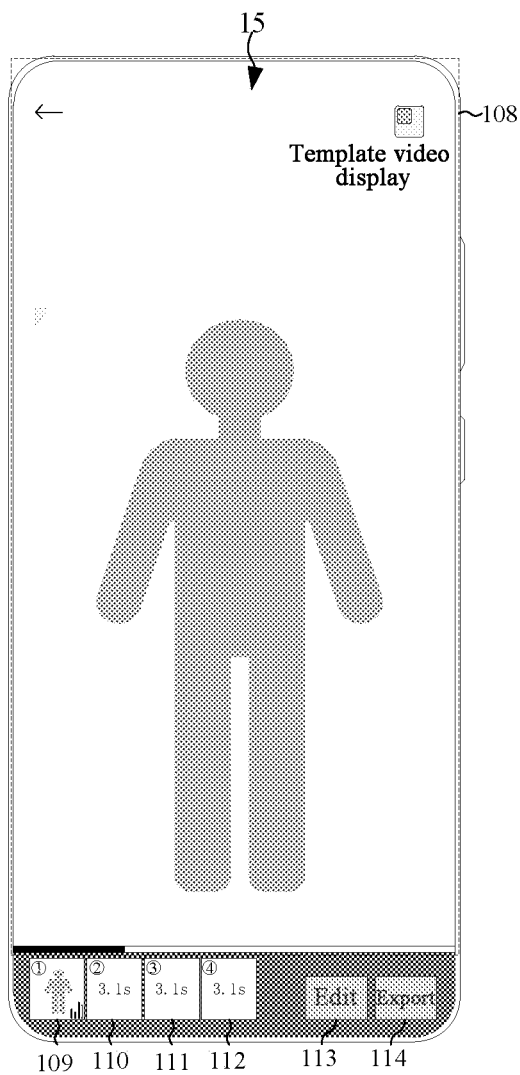

After a segment of video is photographed and is confirmed for use, a video material is imported into one of the four video clip, for example, the video material 1 is imported into the video clip 1, and when it is detected that a video material has been imported into at least one video clip, the application 1 may display a user interface 14 as shown in FIG. 3D. Please refer to the user interface 14, the video thumbnail of the video material 1 is displayed in the region 103 corresponding to the clip identifier 1, and the control 107 is in the operable state. The application 1 detects a trigger operation of the user for the control 107, the application 1 may display, on the mobile phone, a user interface 15 as shown in FIG. 3E, and the user interface 15 is used for displaying the preview page.

The user interface 15 includes a region 108, and a region 109 to a region 112.

The region 108 is used for playing the editing result. During the process of playing the editing result, the video clips 2 to 4 are filled with a black-screen picture, and the original effect and sound of the template 1 are displayed. A playback progress bar may also be displayed in the region 108, and the user may drag the progress bar to adjust the playback progress of the editing result.

After entering the preview page, it may be defaulted that the display region of the template video is closed, a corresponding template video display switch may be disposed in the preview page, and when the user clicks the template video display switch, the region for displaying the template video may be opened to play the editing result.

The region 109 to the region 112 are all regions for displaying the clip identifiers corresponding to the video clips, similar to the foregoing region 103 to the region 106, and reference may be made to the foregoing description. During the process of playing the editing result in the preview page, when a certain video clip is played, a playback dynamic effect may be displayed in the region where the clip identifier corresponding to the video clip is displayed, and the user may determine which video clip is located at the current playback location by means of observing the playback dynamic effect.

The user interface 15 may further include a control 113 and a control 114.

The control 113 is used for entering a template editing page, and target video materials imported into the four video clips may be edited in the template editing page, for example, text, music and the like may be edited.

The control 114 is used for exporting a target video, which is obtained by editing the video materials according to the editing operation indicated by the video editing template. The control 114 for exporting is disposed in the preview page, which facilitates one-key export of the user, such that the operation is simple.

In the present solution, the states of the control 113 and the control 114 both include the operable state and the inoperable state, and the two states may be distinguished in different display styles, for example, in different colors. In some embodiments, it may be set such that when video materials are imported into all video clips, the control 113 and the control 114 are in the operable state; and when there is one or more first video clips, the control 113 and the control 114 are in the inoperable state. For example, as shown in FIG. 3E, since the video clips 2 to 4 are first video clips, both the control 113 and the control 114 are displayed in "gray background+gray text", and are in the inoperable state.

Based on the embodiment as shown in FIG. 3E, the region for displaying the clip identifier is operable. When the region corresponding to any clip identifier is clicked, the material editing page may be entered. If a video material is imported into the video clip corresponding to the clip identifier selected by the user, the video material may be played in a playback region of the material editing page, and may be played in a cyclic manner; and if a video material is not imported into the video clip corresponding to the clip identifier clicked by the user, the preset video material, for example, a video of the black-screen picture, may be played in the playback region of the material editing page.

Figure 3F:
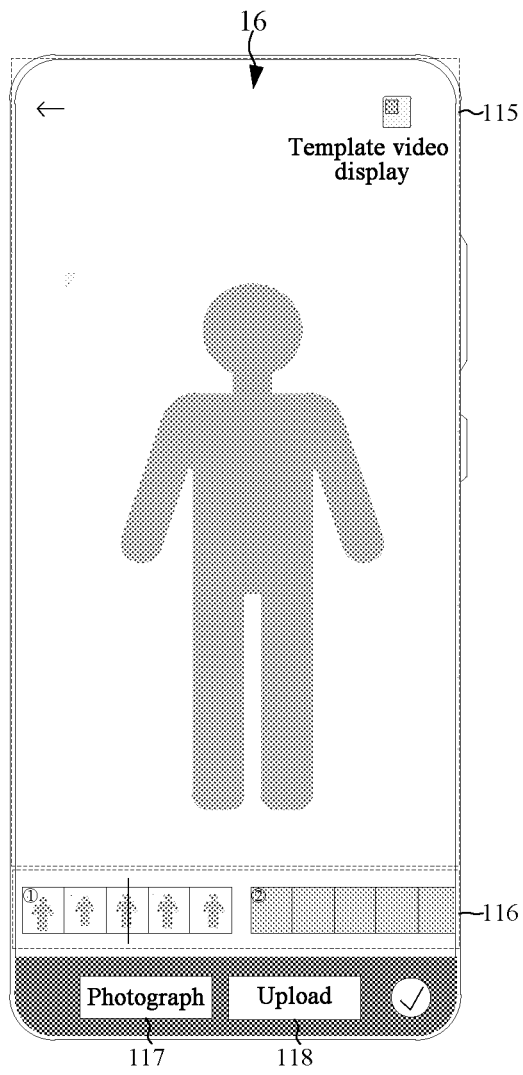

Exemplarily, on the basis of the embodiment as shown in FIG. 3E, it is assumed that the application 1 receives a trigger operation of the user for the region 109 corresponding to the clip identifier 1, the application 1 exemplarily displays, on the mobile phone, a user interface 16 as shown in FIG. 3F, and the user interface 16 is used for displaying the material editing page.

The user interface 16 includes a region 115, a region 116, an entrance 117 and an entrance 118, wherein the region 115 is used for playing a picture of the video material; the region 116 is used for displaying elongated tracks of the video materials corresponding to the video clips, and different tracks are arranged in sequence, for example, four tracks are horizontally arranged from left to right and are kept consistent with the sequence of the video clips 1 to 4, the user may switch to the tracks of the video materials corresponding to the other video clips via transverse sliding, and there are progress identifiers on the tracks for displaying the playback progress. For example, as shown in FIG. 3F, it is currently positioned to the elongated track of the video material corresponding to the video clip 1.

In addition, the entrance 117 is a photographing entrance and is used for entering the photographing page; and the entrance 118 is an uploading entrance and is used for entering the material aggregation display page. It should be understood that, if the user selects the elongated track of a certain video material in the user interface 16, it is equivalent to selecting the corresponding video clip, and for the currently selected video clip, the user may enter the photographing page from the entrance 117, so as to add a video material into the video clip or replace the previously imported video material in the video clip, wherein if the existing video material in the video clip is replaced, the application 1 may display a pop-up window to the user, text content of "Rephotograph?" may be displayed in the pop-up window, and it is confirmed to delete the video material and perform rephotographing based on a confirm-to-rephotograph operation input by the user. Or, the user may also enter the material aggregation display page from the entrance 118, so as to add a video material into the video clip or replace the previously imported video material in the video clip, wherein during uploading, the application 1 supports the user to crop the video material which is selected for uploading, and adds the cropped video material into the corresponding video clip after obtaining an instruction of confirming to upload the cropped video material.

After the user confirms to use the photographed video material or determines to use the uploaded video material, it may be skipped back to the photographing page, for example, a user interface 16 as shown in FIG. 3D, and a related dynamic effect of importing the video material into the video clip is displayed.

In the user interface 16 as shown in FIG. 3F, a template video playback switch may also be provided, and when the user clicks the template video playback switch, the region for displaying the template video may be opened for contrast playing.

In addition, when the application 1 supports to import the video material into the last first video clip by means of photographing or uploading, the application 1 automatically skip to the preview page to play the editing result. The user may import the video material into the last first video clip by means of the entrance of any page, which is not limited in the present disclosure, for example, sequential photographing import/uploading import may be performed by means of the interface as shown in FIG. 3B, and the photographing import/uploading import may also be performed by means of the material editing page.

Specifically, if the video material in the last first video clip is imported by means of photographing, in the video confirmation page for photographing the video material, the application 1 receives a trigger operation of the user for the "confirm-to-use control", and automatically skips to the preview page, for example, the user interface 15 in FIG. 3E, except that video materials have been imported into all video clips. If the video material in the last first video clip is imported by means of uploading, after receiving a confirm-to-upload instruction, the application 1 automatically skips to the preview page, for example, the user interface 15 in FIG. 3E, except that video materials have been imported into all video clips.

FIG. 3A to FIG. 3F mentioned above mainly show detailed description of skipping from the playback page of the template video to the photographing page, so as to import the video material into the video clip indicated by the video editing template, and then enter the preview page and the material editing page.

The method provided in the present disclosure further supports to skip from the playback page of the template video as shown in FIG. 3A to the material aggregation display page, so as to import the video material into the video clip indicated by the video editing template, and then enter the preview page and the material editing page.

Figure 3G:
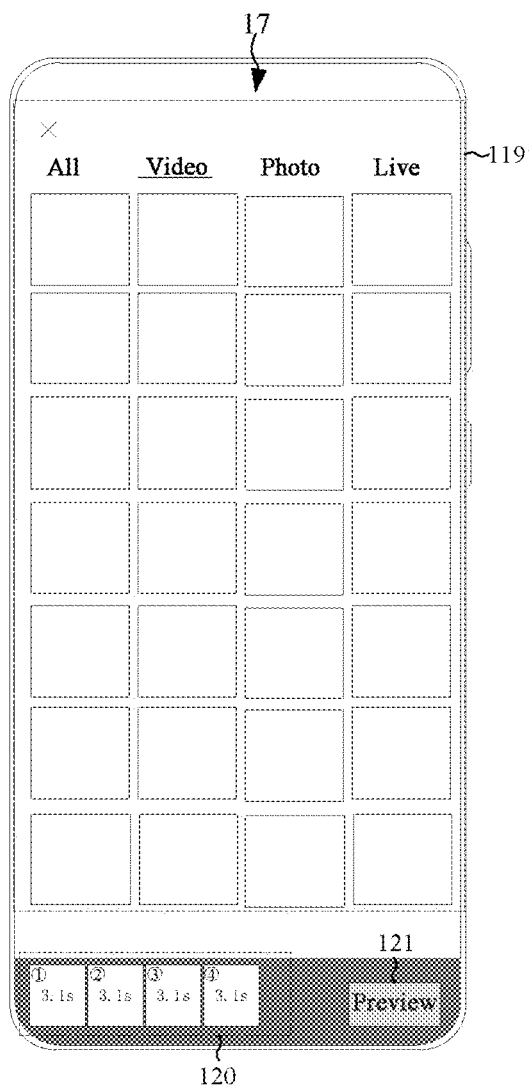

Exemplarily, it is assumed that the control 101 in the user interface 11 as shown in FIG. 3A is implemented by using the text "go to use", after receiving a trigger operation for the control 101, the application 1 may exemplarily display, on the mobile phone, a user interface 17 as shown in FIG. 3G, and the user interface 17 is used for displaying the material aggregation display page.

The user interface 17 may include a region 119, the region 119 is a material aggregation display region, the region 119 may include a plurality of display regions, each display region is used for displaying the thumbnail of one image material, and may identify the selected state of the image material, and the selected image materials may be sequentially added into a plurality of slots according to the selected sequence. In the region 119, if a video material is displayed, the duration of the video material may also be displayed, so that the user selects a video material with a suitable duration for importing. The duration information may be displayed at the edge of the display region corresponding to the video material without shielding the thumbnail of the video material, for example, a lower right corner location, and the duration information of the video material is not shown in FIG. 3G to FIG. 3I. Of course, more information related to the image material may also be displayed in the display region of the image material, for example, a name added by the user for the image material, etc.

In addition, the user interface 17 may further include a region 120, and the region 120 is used for displaying the clip identifier corresponding to the video clip indicated by the template 1. When a video material is not imported into the video clip, the duration of the video clip may be displayed by the clip identifier corresponding to the video clip. The region 120 is similar to the foregoing region 103 to the region 106, reference may be made to the foregoing description, and thus details are not described herein again.

The user interface 17 further includes a control 121, the control 121 is used for entering the preview page, and with regard to the preview page, reference may be made to the detailed description of the user interface 16 as shown in FIG. 3E, thus details are not described herein again.

Referring to FIG. 3G, since no image material is selected, the control 121 is in the inoperable state, and cannot enter the preview page at this time.

Figure 3H:
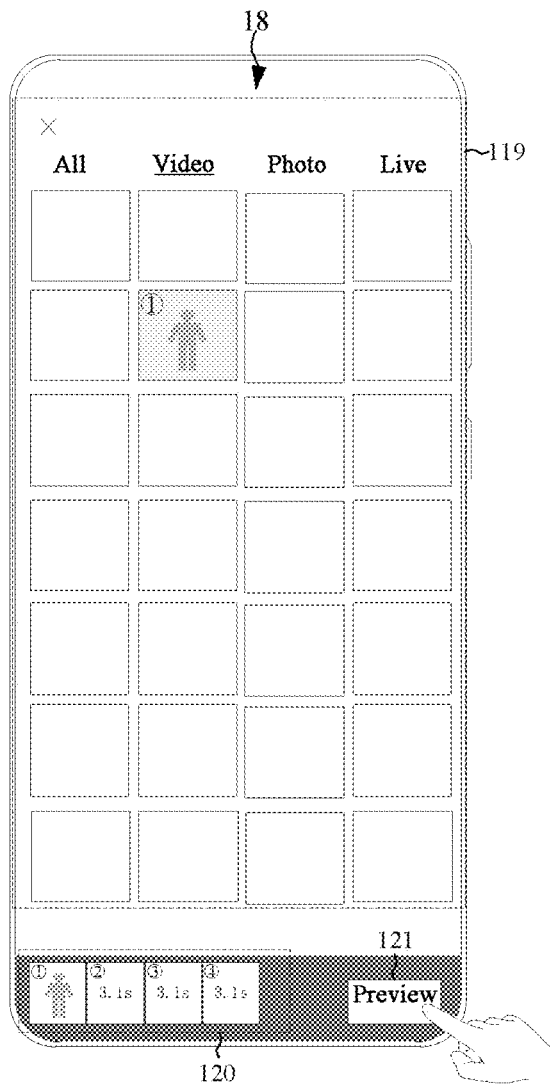

In response to a selection operation of the user for one video material in the material aggregation display region 119, the application 1 adds the selected video material 1 into the video clip 1 as a video material to be edited, since the condition that the video material has been imported into at least one video clip is met, the control 121 is switched from the inoperable state to the operable state, exemplarily, as shown by a user interface 18 shown in FIG. 3H, the display style of the control 121 is different from the display style in FIG. 3G, and thus the user may clearly distinguish whether the control 121 is operable.

Next, the user may enter the preview page by means of operating the control 121, and enter the material editing page via the preview page, the implementation manner is similar to that in the embodiments shown in FIG. 3D to FIG. 3F, and thus details are not described herein again.

In some cases, if the user enters the preview page in the manner as shown in FIG. 3G to FIG. 3H, if the user returns via the preview page, the user may return to the material aggregation display page as shown in FIG. 3H, and each selected image material maintains the selected state.

Figure 3I:
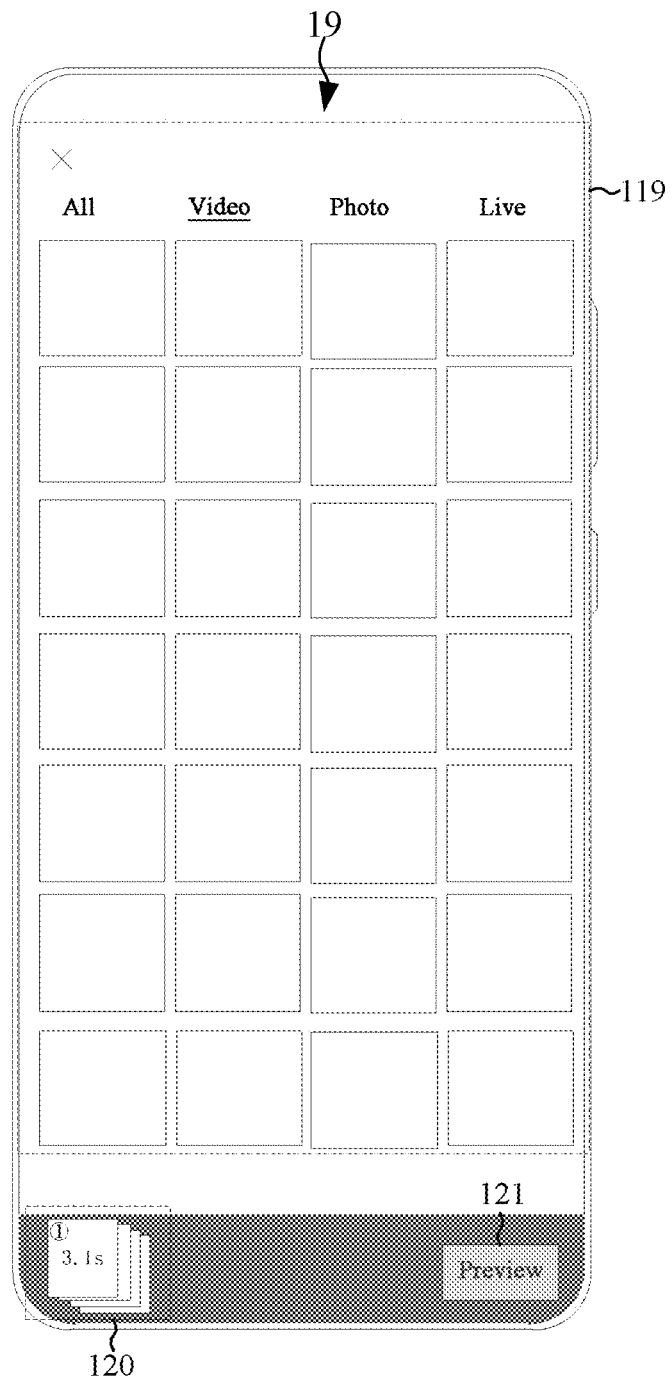

In addition, when the clip identifiers of a plurality of video clips are displayed in the material aggregation display page, the plurality of clip identifiers may also be repeatedly switched between two display styles of tiled display and stacked display, the switching condition is similar to the foregoing switching condition, and thus details are not described herein again. Exemplarily, referring to a user interface 19 as shown in FIG. 3I, on the basis of the user interface 17 as shown in FIG. 3G, it is assumed that a click operation is not detected within a preset duration, then the user interface 19 is displayed, and the plurality of clip identifiers are displayed in the stacked manner.

By means of the embodiments as shown in FIG. 3A to FIG. 3I, in a scenario in which the video editing template is used for performing video editing, the clip identifier in one-to-one correspondence with the video clip indicated by the video editing template is displayed based on the video editing template, so as to prompt the user to import the video material into the specified video clip corresponding to the clip identifier; in response to the trigger operation of presenting the editing result, the editing result, which is obtained by applying, on the target video material, the specified editing operation indicated by the video editing template, is presented, wherein the target video material corresponds to the specified video clip on the one-to-one basis; the target video material is used to be imported into the corresponding specified video clip to form the editing result; and if the specified video clip includes the first video clip into which the user does not import the video material, the preset video material is added into the first video clip. By using the method, in the case where the video material is not completely imported into the video clip indicated by the video editing template, the user can conveniently and flexibly preview the editing result, thereby improving the video editing experience. In addition, when it is detected that the switching condition is met, the display style of the clip identifier may be switched, thereby improving the interestingness and facilitating to improve the visual effects.

Exemplarily, the present disclosure further provides a video editing apparatus.

Figure 4:
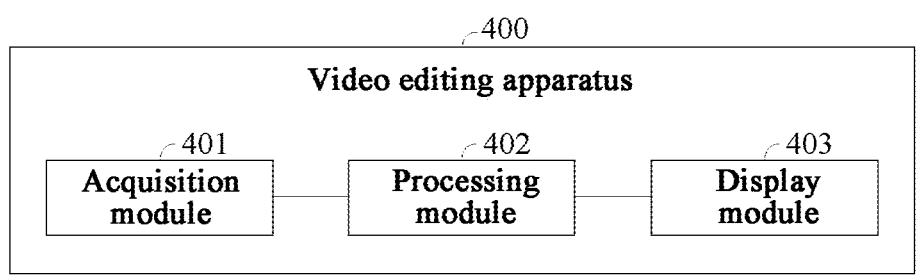
FIG. 4 is a structural diagram of a video editing apparatus provided in an embodiment of the present disclosure.

FIG. 4 is a structural diagram of a video editing apparatus provided in an embodiment of the present disclosure. Please refer to FIG. 4, the video editing apparatus 400 provided in the present embodiment includes:

an acquisition module 401 configured to acquire a video editing template;

a processing module 402 configured to generate a clip identifier based on the video editing template, wherein the video editing template is used for instructing to apply a specified editing operation on at least one specified video clip, the clip identifier corresponds to the specified video clip on a one-to-one basis, and the clip identifier is used for prompting a user to import a video material for the specified video clip corresponding to the clip identifier; and a display module 403 configured to display the clip identifier;

the processing module 402 is further configured to: in response to a trigger operation of presenting an editing result, based on a target video material and the specified editing operation, present the editing result that is obtained by applying the specified editing operation on the target video material, wherein the target video material corresponds to the specified video clip on the one-to-one basis; the target video material is used to be imported into the specified video clip corresponding to the target video material, so as to form the editing result; and if the specified video clip includes a first video clip, the target video material corresponding to the first video clip is a preset video material, and the first video clip is a specified video clip into which the user does not import a video material in response to the trigger operation; and the display module is further configured to present the editing result.

In some embodiments, if the specified video clip includes a second video clip, the target video material corresponding to the second video clip is a video material that is imported by the user for the second video clip, and the second video clip is a specified video clip into which the user has imported a video material in response to the trigger operation.

In some embodiments, the display module 403 is further configured to display a preview control, wherein when the user does not import a video material into the specified video clip corresponding to any clip identifier, the preview control is in an inoperable state; and the processing module 402 is further configured to detect whether a video material is successfully imported into the specified video clip corresponding to the at least one clip identifier, and when it is detected that the video material is successfully imported into the specified video clip corresponding to the at least one clip identifier, switch the preview control from the inoperable state to an operable state by means of the display module 403, wherein the preview control is in the operable state is used for triggering to present the editing result.

In some embodiments, the display module 403 is specifically configured to display a material aggregation display page based on the video editing template, and display the preview control in the material aggregation display page; or, display a photographing page based on the video editing template, and display the preview control in the photographing page.

In some embodiments, the processing module 402 is further configured to: during the process of presenting the editing result that is obtained by applying the specified editing operation on the target video material, in response to a trigger operation for the clip identifier corresponding to the specified video clip, import a video material into a selected specified video track or replace the imported video material in the selected specified video clip.

In some embodiments, if there are a plurality of clip identifiers, the display module 403 is specifically configured to display the plurality of clip identifiers based on the video editing template in a tiled manner.

The processing module 402 is further configured to detect whether a switching condition is met, and when it is detected that the switching condition is met, display the plurality of clip identifiers in a stacked manner by means of the display module 403.

The processing module 402 is further configured to: in the case where the specified video clip includes one first video clip, and the user has imported video materials into all specified video clips other than the first specified video clip, acquire a photographed video material; and in response to a confirm-to-use instruction for the photographed video material, trigger to present the editing result, wherein the confirm-to-use instruction is used for confirming that the photographed video material is the target video material on the first video clip.

The processing module 402 is further configured to: in the case where the specified video clip includes one first video clip, and the user has imported video materials into all specified video clips other than the first specified video clip, acquire a video material from an album; and in response to a confirm-to-upload instruction for the video material acquired from the album, trigger to present the editing result, wherein the confirm-to-upload instruction is used for confirming that the photographed video material is the target video material on the first video clip.

The video editing apparatus provided in the present embodiment may be used for executing the technical solutions of any of the foregoing method embodiments, the implementation principles and technical effects thereof are similar, reference may be made to the detailed description of the foregoing method embodiments, and thus for the sake of brevity, details are not described herein again.

Figure 5:
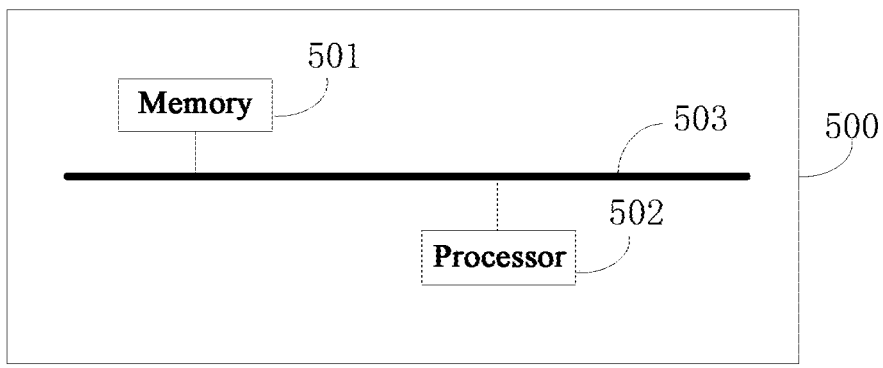
FIG. 5 is a structural diagram of an electronic device provided in an embodiment of the present disclosure.

FIG. 5 is a schematic structural diagram of an electronic device provided in an embodiment of the present disclosure. Referring to FIG. 5, the electronic device 500 provided in the present embodiment includes a memory 501 and a processor 502.

The memory 501 may be an independent physical unit, and may be connected with the processor 502 via a bus 503. The memory 501 and the processor 502 may also be integrated together, implemented by hardware, or the like.

The memory 501 is used for storing a program instruction, and the processor 502 calls the program instruction to execute the operations of any one of the foregoing method embodiments.

Optionally, when some or all of the methods in the foregoing embodiments are implemented by software, the electronic device 500 may only include the processor 502.

The memory 501 used for storing the program is located outside the electronic device 500, and the processor 502 is connected with the memory via a circuit/wire, and is used for reading and executing the program stored in the memory.

The processor 502 may be a central processing unit (central processing unit, CPU), a network processor (network processor, NP), or a combination of the CPU and the NP.

The processor 502 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The memory 501 may include a volatile memory (volatile memory), for example, a random-access memory (random-access memory, RAM); the memory may also include a non-volatile memory (non-volatile memory), for example, a flash memory (flash memory), a hard disk drive (hard disk drive, HDD), or a solid-state drive (solid-state drive, SSD); and the memory may further include a combination of the foregoing types of memories.

An embodiment of the present disclosure further provides a readable storage medium, including: a computer program instruction, wherein when executed by at least one processor of an electronic device, the computer program instruction implements the video editing method shown in any one of the foregoing method embodiments.

An embodiment of the present disclosure further provides a computer program product, wherein the computer program product includes a computer program instruction, the computer program instruction is stored in a readable storage medium, at least one processor of an electronic device may read the computer program instruction from the readable storage medium, and the at least one processor executes the computer program instruction, so that the electronic device implements the video editing method as shown in any one of the foregoing method embodiments.

It should be noted that, in this paper, relational terms, such as "first" and "second", are merely used for distinguishing one entity or operation from another entity or operation, and do not necessarily require or imply that any such actual relationship or order exists between these entities or operations. Moreover, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such a process, method, article or device. If there are no more restrictions, the element defined by the sentence "including a . . . " does not exclude the existence of other identical elements in the process, the method, the article or the device that includes the element.

The foregoing description is merely a specific embodiment of the present disclosure, so that those skilled in the art can understand or implement the present disclosure. Various modifications to these embodiments are apparent to those skilled in the art, and the general principles defined herein may be implemented in other embodiments without departing from the spirit or scope of the present disclosure. Therefore, the present disclosure will not be limited to these embodiments described herein, but is intended to conform to the widest scope consistent with the principles and novel features disclosed herein.

We claim:

1. A video editing method, comprising:
  acquiring a video editing template, and displaying a clip identifier based on the video editing template, wherein the video editing template is configured to instruct to apply a specified editing operation on a specified video clip, the clip identifier corresponds to the specified video clip on a one-to-one basis, and the clip identifier is configured to prompt to import a video material for the specified video clip corresponding to the clip identifier;
  in response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is to be imported into the specified video clip corresponding to the target video material, so as to form the editing result; and in response to that the specified video clip comprises a first video clip, the target video material corresponding to the first video clip is a preset video material, and the first video clip is a video clip into which a video material is not imported in response to the trigger operation;
  wherein the method further comprises:
  displaying a preview control, wherein when no video material is imported into any video clip corresponding to any clip identifier, the preview control is in an inoperable state; and
  switching the preview control from the inoperable state to an operable state in response to detecting that the target video material is imported into the specified video clip corresponding to the clip identifier, wherein the preview control in the operable state is configured to trigger to present the editing result.

2. The method according to claim 1, further comprising:
  in response to that the specified video clip comprises a second video clip, the target video material corresponding to the second video clip is a video material that is imported by a user for the second video clip, and the second video clip is a specified video clip into which the user has imported a video material in response to the trigger operation.

3. The method according to claim 1, wherein displaying the clip identifier based on the video editing template comprises:
  displaying a material aggregation display page based on the video editing template, and displaying the preview control in the material aggregation display page; or
  displaying a photographing page based on the video editing template, and displaying the preview control in the photographing page.

4. The method according to claim 1, further comprising:
  during the process of presenting the editing result that is obtained by applying the specified editing operation on the target video material, in response to a trigger operation for the clip identifier corresponding to the specified video clip, importing a video material into a selected specified video track or replacing the imported video material in the selected specified video clip.

5. The method according to claim 1, wherein there are a plurality of clip identifiers, and wherein the method further comprises:
  displaying the plurality of clip identifiers based on the video editing template in a tiled manner; and
  in response to detecting that a switching condition is met, displaying the plurality of clip identifiers in a stacked manner.

6. The method according to claim 1, further comprising:
  in the case where the specified video clip comprises one first video clip, and a user has imported video materials into all specified video clips other than the first specified video clip, acquiring a photographed video material; and in response to a confirm-to-use instruction for the photographed video material, triggering to present the editing result, wherein the confirm-to-use instruction is used for confirming that the photographed video material is the target video material on the first video clip.

7. The method according to claim 1, further comprising:
  in the case where the specified video clip comprises one first video clip, and a user has imported video materials into all specified video clips other than the first specified video clip, acquiring a video material from an album; and in response to a confirm-to-upload instruction for the video material acquired from the album, triggering to present the editing result, wherein the confirm-to-upload instruction is used for confirming that the photographed video material is the target video material on the first video clip.

8. An electronic device, comprising: a memory and a processor;
  the memory is configured to store a computer program instruction; and
  the processor is configured to execute the computer program instruction, so as to cause the electronic device to perform acts comprising:
  acquiring a video editing template, and displaying a clip identifier based on the video editing template, wherein the video editing template is configured to instruct to apply a specified editing operation on a specified video clip, the clip identifier corresponds to the specified video clip on a one-to-one basis, and the clip identifier is configured to prompt to import a video material for the specified video clip corresponding to the clip identifier;
  in response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is to be imported into the specified video clip corresponding to the target video material, so as to form the editing result; and in response to that the specified video clip comprises a first video clip, the target video material corresponding to the first video clip is a preset video material, and the first video clip is a specified video clip into which a video material is not imported in response to the trigger operation;
  wherein the acts further comprise:
  displaying a preview control, wherein when no video material is imported into any video clip corresponding to any clip identifier, the preview control is in an inoperable state; and switching the preview control from the inoperable state to an operable state in response to detecting that the target video material is imported into the specified video clip corresponding to the clip identifier, wherein the preview control in the operable state is configured to trigger to present the editing result.

9. The electronic device according to claim 8, the acts further comprising:
in response to that the specified video clip comprises a second video clip, the target video material corresponding to the second video clip is a video material that is imported by a user for the second video clip, and the second video clip is a specified video clip into which the user has imported a video material in response to the trigger operation.

10. The electronic device according to claim 8, wherein displaying the clip identifier based on the video editing template comprises:
displaying a material aggregation display page based on the video editing template, and displaying the preview control in the material aggregation display page; or
displaying a photographing page based on the video editing template, and displaying the preview control in the photographing page.

11. The electronic device according to claim 8, the acts further comprising:
during the process of presenting the editing result that is obtained by applying the specified editing operation on the target video material, in response to a trigger operation for the clip identifier corresponding to the specified video clip, importing a video material into a selected specified video track or replacing the imported video material in the selected specified video clip.

12. The electronic device according to claim 8, wherein there are a plurality of clip identifiers, and wherein the acts further comprise:
displaying the plurality of clip identifiers based on the video editing template in a tiled manner; and
in response to detecting that a switching condition is met, displaying the plurality of clip identifiers in a stacked manner.

13. The electronic device according to claim 8, the acts further comprising:
in the case where the specified video clip comprises one first video clip, and a user has imported video materials into all specified video clips other than the first specified video clip, acquiring a photographed video material; and in response to a confirm-to-use instruction for the photographed video material, triggering to present the editing result, wherein the confirm-to-use instruction is used for confirming that the photographed video material is the target video material on the first video clip.

14. The electronic device according to claim 8, the acts further comprising:
in the case where the specified video clip comprises one first video clip, and a user has imported video materials into all specified video clips other than the first specified video clip, acquiring a video material from an album; and in response to a confirm-to-upload instruction for the video material acquired from the album, triggering to present the editing result, wherein the confirm-to-upload instruction is used for confirming that the photographed video material is the target video material on the first video clip.

15. A non-transitory readable storage medium, comprising: a computer program instruction, wherein at least one processor of an electronic device executes the computer program instruction, so as to cause the electronic device to perform acts comprising:
acquiring a video editing template, and displaying a clip identifier based on the video editing template, wherein the video editing template is configured to instruct to apply a specified editing operation on a specified video clip, the clip identifier corresponds to the specified video clip on a one-to-one basis, and the clip identifier is configured to prompt to import a video material for the specified video clip corresponding to the clip identifier;
in response to a trigger operation of presenting an editing result, based on a target video material and the specified editing operation, presenting the editing result that is obtained by applying the specified editing operation on the target video material, wherein the target video material corresponds to the specified video clip on the one-to-one basis; the target video material is to be imported into the specified video clip corresponding to the target video material, so as to form the editing result; and in response to that the specified video clip comprises a first video clip, the target video material corresponding to the first video clip is a preset video material, and the first video clip is a specified video clip into which a video material is not imported in response to the trigger operation;
wherein the acts further comprise:
displaying a preview control, wherein when no video material is imported into any video clip corresponding to any clip identifier, the preview control is in an inoperable state; and
switching the preview control from the inoperable state to an operable state in response to detecting that the target video material is imported into the specified video clip corresponding to the clip identifier, wherein the preview control in the operable state is configured to trigger to present the editing result.

16. The non-transitory readable storage medium according to claim 15, the acts further comprising:
in response to that the specified video clip comprises a second video clip, the target video material corresponding to the second video clip is a video material that is imported by a user for the second video clip, and the second video clip is a specified video clip into which the user has imported a video material in response to the trigger operation.

17. The non-transitory readable storage medium according to claim 15, wherein displaying the clip identifier based on the video editing template comprises:
displaying a material aggregation display page based on the video editing template, and displaying the preview control in the material aggregation display page; or
displaying a photographing page based on the video editing template, and displaying the preview control in the photographing page.

18. The non-transitory readable storage medium according to claim 15, the acts further comprising:
during the process of presenting the editing result that is obtained by applying the specified editing operation on the target video material, in response to a trigger operation for the clip identifier corresponding to the specified video clip, importing a video material into a selected specified video track or replacing the imported video material in the selected specified video clip.

19. The non-transitory readable storage medium according to claim 15, wherein there are a plurality of clip identifiers, and wherein the acts further comprise:
- displaying the plurality of clip identifiers based on the video editing template in a tiled manner; and
- in response to detecting that a switching condition is met, displaying the plurality of clip identifiers in a stacked manner.

* * * * *